(12) United States Patent
Heller et al.

(10) Patent No.: US 8,335,731 B1
(45) Date of Patent: Dec. 18, 2012

(54) METHOD OF ESTABLISHING A PROFITABILITY MODEL RELATED TO THE ESTABLISHMENT OF A WIND POWER PLANT

(75) Inventors: Kristoffer Claudi Heller, Barcelona (ES); Flemming Lundager Petersen, Arhus V (DK); Allan Linderup Smed, Skodstrup (DK); Martin Duraj Jensen, Aalborg (DK)

(73) Assignee: Vestas Wind Systems A/S, Aarhus N (DK)

( * ) Notice: Subject to any disclaimer, the term of this patent is extended or adjusted under 35 U.S.C. 154(b) by 567 days.

(21) Appl. No.: 12/344,403

(22) Filed: Dec. 26, 2008

Related U.S. Application Data

(60) Provisional application No. 61/017,342, filed on Dec. 28, 2007.

(51) Int. Cl.
*G06Q 40/00* (2006.01)
(52) U.S. Cl. .......................................... 705/35; 705/37
(58) Field of Classification Search .................. 705/35, 705/37
See application file for complete search history.

(56) References Cited

U.S. PATENT DOCUMENTS 7,171,287 B2 * 1/2007 Weiss ............................ 700/291
2002/0194145 A1 12/2002 Boucher et al.

OTHER PUBLICATIONS

P.E Morthorst (Capacity development and profitability of wind turbines, Energy Policy, vol. 27, Issue 13, Nov. 30, 1999, pp. 779-787, ISSN 0301-4215, 10.1016/S0301-4215(99)00067-1. (http://www.sciencedirect.com/science/article/pii/S0301421599000671).*

* cited by examiner

*Primary Examiner* — Ojo O Oyebisi
(74) *Attorney, Agent, or Firm* — Patterson & Sheridan, LLP

(57) ABSTRACT

A method of establishing a profitability model for use in the establishment of a wind power plant, the method including the steps of: establishing wind power plant-related data related to a scenario; calculating the profitability of the wind power plant by using a data processing system, by making use of the wind power-related data such as solution parameters and financing parameters, in relation to at least one scenario; and presenting a profitability model related to establishing a wind power plant based on the scenario and the calculated profitability using data processing system. Benefits of this profitability model minimizes risk and improves the basis for decision regarding the establishment of a wind power plant.

21 Claims, 4 Drawing Sheets

METHOD OF ESTABLISHING A PROFITABILITY MODEL RELATED TO THE ESTABLISHMENT OF A WIND POWER PLANT

CROSS-REFERENCE TO RELATED APPLICATIONS

The present application claims the benefit under 35 U.S.C. §119 (e) of the U.S. Provisional Patent Application Ser. No. 61/017,342 filed on Dec. 28, 2007.

FIELD OF THE INVENTION

The invention relates to a method of establishing a profitability model in relation to the establishment of a wind power plant.

BACKGROUND OF THE INVENTION

American application US 2002/0194145A1 describes a method and system for financing the construction of a renewable energy-generating facility.

This application discloses a method for financing the energy generating facility by dividing the facility into attributes such as rights and interests in and to energy. A method of purchasing a price for these attributes with the purpose of selling the attributes is disclosed in the application.

SUMMARY OF THE INVENTION

The invention relates to a method of establishing a profitability model related to the establishment of a wind power plant, the method comprising the steps of:
  establishing wind power plant-related data related to a scenario,
  wherein a scenario is at least partly defined by a selected number of wind turbines in the wind power plant and a selected type of wind turbines and
  wherein said wind power plant-related data include solution parameters and financing parameters,
    wherein said solution parameters include costs and performance related to the selected number of wind turbines in the wind power plant and the selected type of wind turbines according to said scenario,
    wherein said financing parameters include cost of capital related to the selected number of wind turbines in the wind power plant and the selected type of wind turbines according to said scenario,
  wherein said wind power plant-related data include estimated revenues related to the scenario,
  calculating the profitability of the wind power plant by means of a data processing system, by making use of said solution parameters and financing parameters, in relation to at least one scenario,
  presenting at least one profitability model related to establishing a wind power plant based on said at least one scenario and the calculated profitability by means of said data processing system.

A profitability model may e.g. be defined as retrieving parameters about all or some aspects related to a given scenario e.g. a project to be evaluated. And moreover, there may be opportunity to compare one or more scenarios within one model, here preferably in relation to a wind power plant.

In connection with the calculation of profitability, it should generally be noted that the phrasing "making use of" implies that the parameters referred to are applied and that further parameters are optional.

Within the scope of the invention it may be advantageous to collocating parameters regarding the overall wind power plant project from various parameter types. These parameter types may include site, market, financing and solution where each parameter type comprises at least one underlying parameter of interest to the overall wind power plant project and thereby to the profitability model.

It may be known in relation to a wind power plant to make calculations within one parameter type e.g. to find a preferred loan type, estimated annual energy production or other sub elements of the overall wind power plant project, but the profitability model disclosed in this document brings added value by preferably including all parameter types regarding the overall power plant project. This is beneficial for all users of the profitability model e.g. model operator, sales representatives, customers, investors, etc.

The tangible result of executing the profitability model may e.g. launch the construction of the wind power plant comprising the selected site, wind turbine types, number of wind turbines, etc.

The tangible result of executing the profitability model may e.g. launch the construction of the wind power plant, comprising at least a subset of the elements in the selected scenario.

Alternatively the tangible result of executing the profitability model may e.g. result in setting up a wind power plant project plan according to the most profitable scenario given by the profitability model.

The tangible result of executing the profitability model may also be used to establish a wind power plant project plan e.g. according to a least one scenario given by the profitability model. It might be the most profitable scenario displayed by the profitability.

In another embodiment of the invention, the tangible result of executing the profitability model might be evaluating the wind turbine types in production with the demand for specific wind turbine types at different sites. This might benefit the wind turbine manufacture by supplying the wind turbine types that best fit the specific sites. Furthermore, the profitability model may be executed by the wind turbine manufacturer to see where their solutions differentiate from competitors.

The tangible result of executing the profitability model may also be useful for the investor, customer, etc. to achieve a lower cost of capital from the bank, capital partner, etc., than if the wind power plant project was not executed in the profitability model.

Whereby the wind power plant comprises at least one wind turbine.

Whereby the profitability model establishes at least one scenario of a wind power plant which may comprise details related to the profitability of the wind power plant. The at least one scenario of a wind power plant may be based on parameters applied by the user of the profitability model.

Whereby parameters applied by the user may e.g. comprise parameters related to the solution and financing of the wind power plant. The solution may e.g. be understood as cost parameters related to the wind turbines, service and maintenance. The financing may e.g. be understood as cost of capital related to the financial situation of the customer or investor.

Whereby revenues related to the scenario may e.g. include estimated price per MWh or the value of selling certificates related to a wind power plant e.g. carbon emission reduction certificates etc.

Whereby the data processing system may e.g. be understood as any computer, data processor or logical circuit at least capable of calculating the profitability, costs or revenues related to a wind power plant.

The presentation of data may e.g. include displaying the data. Displaying data may e.g. include displaying on a screen or in hard copy displaying by means of numbers, graphs, pictures, letters or any other means for displaying.

Whereby it may be possible to correct or input parameters to the model during the process of establishing a wind power plant if new or more reliable parameters appear.

Whereby the profitability model of a wind power plant project may help both the customer and the model operator. For both the customer and the model operator, the profitability model may provide an otherwise not existing overview of the interaction, correlation or sensitivity of multiple parameters influencing the wind power plant project. The profitability model is aggregating the multiple parameters to make estimations related to the profitability of the entire wind power plant project. The customer benefits in decision making e.g. by selection of wind turbines based on estimations from the financial model. The model operator benefits by using the financial model to help finding the accurate price and the right product to offer to the customer.

Whereby the profitability model is provided with information related to the solution, because of the difference in energy production between two types of wind turbines. If it is decided to erect one type of wind turbine it may be advantageous to compare the choice with at least one other type of wind turbine to observe e.g. the difference in pay back time of the investment between the two types of wind turbines.

In an embodiment of the invention, said wind power plant-related data comprises market parameters, and wherein said market parameters includes rules and regulations affecting the selected number of wind turbines in the wind power plant and the selected type of wind turbines according to said scenario.

In an embodiment of the invention, said wind power plant-related data comprises site parameters, and wherein said site parameters includes wind conditions affecting the selected number of wind turbines in the wind power plant and the selected type of wind turbines according to said scenario.

In an embodiment of the invention, the scenario represents a projected wind power plant.

Whereby it is possible to build up a model of a wind power plant by means of the profitability model. Before the construction of the wind power plant begins it is possible to change e.g. the types and numbers of wind turbines several times.

Whereby the non-existing wind power plant may be re-modeled several times, from the beginning of the project planning until one scenario is selected and eventually implemented.

Whereby the profitability model may be used to evaluate one or more scenarios of a non-existing wind power plant, i.e. projected wind power plants. It should be noted that a projected wind power plant not necessarily relates to a project which has been determined but rather to a project description which may be selected by using the profitability model.

In an embodiment of the invention, said selected type of wind turbines are the same type of wind turbines.

In an embodiment of the invention, said selected type of wind turbines are different types of wind turbines.

Hereby it is possible to establish a scenario where different types of wind turbines are combined into one scenario.

In an embodiment of the invention, said selected type of wind turbines in different scenarios includes wind turbine types from one or more wind turbine manufacturers.

Hereby it is possible to establish a profitability model upon which different scenarios may be compared. This may in a particular embodiment of the invention even include comparisons of wind turbines from one or more manufacturers. Such information may thus be utilized for the performing of an in-depth selection between a diversity of wind turbine manufacturers and also, in relation to a specific manufacturer, to evaluate whether the product portfolio may be modified or expanded to establish a profitable scenario if the existing wind turbine types does not result in a satisfactory profit.

In an embodiment of the invention, said wind power plant-related data relates to parameters at least partly related to assumptions related to establishing a wind power plant.

Where the wind power plant-related data may be distinguished as verified data and data based on assumptions. It is noted that the borderlines between what is regarded as data based on assumption and verified data may be somewhat floating, however, still maintaining the fact that some of the data, in particular in relation to predictions with respect to power production, obtained revenues, wind predictions in relation to the site, etc., represents predictive data. Further data, also referred to a verified data, may refer to data which is based on more precise and accurate knowledge, still considering the fact that the verified data may be applied "on top" of data based on assumptions, thereby resulting in that the verified data may inherit the uncertainties of the data based on assumptions.

Whereby verified data may be more accurate data e.g. relating to financial parameters, different types of cost, etc.

Where all parameters in the profitability model may be initialized to default values before starting a project. These default values may be assumptions based on technical know-how or experience from earlier wind power plant projects.

Whereby the profitability model is provided with verified data as early in the project period as possible, to make the scenario presented by the profitability model as reliable as possible.

Where the verified data may be data with very little risk of being changed during the project period such as the price of a wind turbine or the equity of the investor.

In an embodiment of the invention, the profitability model includes two or more scenarios.

Where the profitability model may include two or more scenarios where it is possible to generate tangible data for the purpose of comparing the profitability of one or more wind power plant establishments by different types of wind turbines and maybe also a different number of wind turbines.

Where the profitability model calculate more than one scenario, so that the customer and/or the model operator may choose the scenario which fits the customer best.

Where the profitability model is provided with data related to more than one site so that the customer and/or the model operator may choose the site which fits the customer best.

In an embodiment of the invention, the scenario includes revenue parameters, cost parameters and financing parameters.

Revenue parameters are possible estimates for revenue related to the selected scenario which is partly defined by the selected number of wind turbines in the wind power plant and the selected type of wind turbines.

Examples of revenue parameters may by estimated annual MWh production, availability, electricity price or yearly price adjustment.

Cost parameters are possible estimates for the costs related to the selected scenario which is partly defined by the selected number of wind turbines in the wind power plant and the selected type of wind turbines Examples of cost parameters may relate to nacelle, towers, transportation, erection, civil works, electrical works or maintenance.

Financing parameters are possible estimates for the financing related to the selected scenario which is partly defined by the selected number of wind turbines in the wind power plant and the selected type of wind turbines.

Examples of financing parameters may be the financial discount factor related to the investors cost of capital, interest rate, duration of loan or debt share of funding.

It may be advantageous to let the profitability model present at least two scenarios related to a specific site. If the presented scenarios do not meet to the demands from e.g. the customer, new data is applied to the profitability model which then presents at least one new scenario to the site.

In an embodiment of the invention, said method automatically establishes and presents at least one alternative scenario related to establishing a wind power plant by the application of a scenario having different parameters.

The system may e.g. present different alternatives of establishing a wind power plant on the same site e.g. by choosing different types of wind turbines and calculating the resulting parameters.

In other words, the data processing system may be configured to exchange certain parameters with other values or settings defining the scenario and subsequently based on said wind power plant-related costs and revenues calculating the profitability of the wind power plant by means of a data processing system in relation to at least one alternative scenario.

The automatic exchange of parameter settings may e.g. be an automatic exchange of wind turbines and a subsequent execution of the profitability model for the purpose of checking whether more profitable scenarios may be obtained by other wind turbine types or makes.

This automatic exchange of parameters may also be performed in relation to certain site candidates, financing parameters, etc.

In an embodiment of the invention, said profitability model is used to forecast the financial risk for a wind power plant project.

It may be very advantageous to be able to make estimation in the form of a forecast of data related to a wind power plant. Such data may e.g. comprise estimated revenue of the whole project, revenue or costs pr. MWh, time of depreciation or other economical data.

It may be very advantageous for the customer to have a reliable forecast of the financial risk when presenting the wind power plant project to further investors. It may be easier to convince an investor to invest in a project when a reliable overview of the financial risk is available.

In an embodiment of the invention, said profitability model is used to estimate the financial situation related to a wind power plant as a result of a scenario modified over time, e.g. after the wind power plant is put into operation.

It may be very advantageous to be able to change parameters in a scenario presented by the profitability model, after the wind power plant is put into operation. The first scenario presented by the profitability model is partly based upon assumptions and after the wind power plant is put into operation it may be possible to make some assumptions more reliable and thereby the profitability model may present a more reliable scenario of the future financial situation of the wind power plant.

The profitability model may also generally be applied for the purpose of benchmarking and validation of wind power plants when these have been physically implemented and the model may also be used for the purpose of checking the validity of earlier predictions.

The profitability model may be implemented by conventional computational algorithms or it may be implemented on the basis of artificial intelligence.

Whichever method is applied, the model and/or the assumption applied in the model may be checked and updated to include any experience gained when the wind power plant is actually implemented.

In an embodiment of the invention, said solution parameters further comprise parameters relating to the make of the wind turbines.

Where it is possible to select between more than one manufacture of wind turbines.

In an embodiment of the invention, said solution parameters further comprise parameters relating to the hub height of the wind turbines.

Where it is possible to select between more than one hub height of a wind turbine. The weather conditions at one site may be exploited best with one type of wind turbine with a specific height. Another site, with other wind conditions may be exploited best with the same type of wind turbine but with another height.

In an embodiment of the invention, said solution parameters include parameters relating to service and maintenance of the wind turbines.

Where estimated expenses on servicing and maintaining the wind power plant are applied in the profitability model. This may include expenses to predicted service such as replacement of e.g. gear oil, unpredicted service such as replacement of larger components in the wind turbine such as generator or blades.

In an embodiment of the invention, said financing parameters further comprise parameters relating to type of loan.

Where the profitability model is provided with information related to the financial situation of the customer. When the customer's cost of capital is applied to the profitability model, the profitability model may present e.g. an estimation of the pay back time of the investment which may form the basis for a decision of the realisation of a project.

In an embodiment of the invention, said financing parameters further comprise parameters relating to duration of loan.

Where the duration of loan may affect the cost of capital of the investor or customer. Loans with a short duration time may often be less attractive compared to loans with longer duration time and therefore it may be advantageous to apply the profitability model with information relating to the duration time of loan.

In an embodiment of the invention, said financing parameters further comprise parameters relating to the financial discount factor related to the investors cost of capital.

In an embodiment of the invention, said financing parameters further comprise parameters relating to debt financing.

In an embodiment of the invention, said financing parameters further comprise parameters relating to debt interest rate.

In an embodiment of the invention, said market parameters comprise parameters relating to taxes.

Where the profitability model is provided with information related to the market where the wind power plant is to be built because the local market may affect the costs related to establishing of the wind power plant. Information related to the market may e.g. comprise taxes, discounts, price of local workers, etc.

Where information related to two different markets is applied to the profitability model and the customer may include the difference in price between two different markets when deciding the best market for the site of the wind power plant.

In an embodiment of the invention, said market parameters further comprise parameters relating to depreciation.

In an embodiment of the invention, said market parameters further comprise parameters relating to special incentives for the wind power plant related to said market.

Where information relating to the local market of the site of the wind power plant is applied to the profitability model. Some markets may offer special taxes, duty or excises on renewable energy such as wind energy, which may affect the scenario presented by the profitability model.

In an embodiment of the invention, said site parameters comprise parameters relating to the wind conditions, e.g. average wind speed, turbulence, wind shear etc.

Where the profitability model is provided with information regarding the wind at the location of the wind power plant. Wind information may depend on the height where it is measured and may e.g. comprise wind conditions, e.g. average wind speed, turbulence, wind shear etc. By applying to the profitability model information related to the site, the profitability model can present a more reliable scenario to the specific site.

In an embodiment of the invention, said site parameters further comprise parameters relating to anemometer height.

Where the anemometer height is applied to the profitability model, because the wind speed may vary in different heights. Hence it may affect the selection of type or height of wind turbine.

In an embodiment of the invention, said site parameters further comprise parameters relating to an availability factor.

Where the selection of availability factor may affect the annual energy production, because the time a wind turbine may be out of order or under service it cannot produce energy. Hence the total annual energy production and thereby the annual revenue from the wind turbine may vary.

In an embodiment of the invention, said site parameters further comprise parameters relating to net annual production.

Where the net annual production is measured in MWh.

In an embodiment of the invention, said site parameters further comprise parameters relating to data received from at least one simulation program.

Where the profitability model is provided with data from one or more simulation programs. Through a simulation of the site of the wind power plant it is possible to provide the profitability model with more reliable data than if data is estimated without a simulation program. Such data may e.g. comprise data related to the weather at the site, optimal location of each wind turbine at the site or any other data related to the wind power plant.

Furthermore, the invention relates to a method of establishing a profitability model related to the establishment of a wind power plant, the method comprising the steps of:
establishing wind power plant-related data related to a scenario,
wherein the scenario is at least partly defined by a selected number of wind turbines in the wind power plant and a selected type of wind turbines and
wherein said wind power plant-related data include solution parameters and market parameters,
wherein said solution parameters include costs and performance related to the selected number of wind turbines in the wind power plant and the selected type of wind turbines according to said scenario,
wherein said market parameters include rules and regulations affecting the selected number of wind turbines in the wind power plant and the selected type of wind turbines according to said scenario,
wherein said wind power plant-related data include estimated revenues related to the scenario,
calculating the profitability of the wind power plant by means of a data processing system, by making use of said solution parameters and market parameters, in relation to at least one scenario,
presenting at least one profitability model related to establishing a wind power plant based on said at least one scenario and the calculated profitability by means of said data processing system.

Furthermore, the invention relates to a method of establishing a profitability model related to the establishment of a wind power plant, the method comprising the steps of:
establishing wind power plant-related data related to a scenario,
wherein the scenario is at least partly defined by a selected number of wind turbines in the wind power plant and a selected type of wind turbines and
wherein said wind power plant-related data include solution parameters, site parameters and market parameters
wherein said solution parameters include costs and performance related to the selected number of wind turbines in the wind power plant and the selected type of wind turbines according to said scenario,
wherein said site parameters include wind conditions affecting the selected number of wind turbines in the wind power plant and the selected type of wind turbines according to said scenario,
wherein said market parameters include rules and regulations affecting the selected number of wind turbines in the wind power plant and the selected type of wind turbines according to said scenario,
wherein said wind power plant-related data include estimated revenues related to the scenario,
calculating the profitability of the wind power plant by means of a data processing system, by making use of said solution parameters, site parameters and market parameters, in relation to at least one scenario,
presenting at least one profitability model related to establishing a wind power plant based on said at least one scenario and the calculated profitability by means of said data processing system.

Furthermore, the invention relates to a method of establishing a profitability model related to the establishment of a wind power plant, the method comprising the steps of:
establishing wind power plant-related data related to a scenario,
wherein the scenario is at least partly defined by a selected number of wind turbines in the wind power plant and a selected type of wind turbines and
wherein said wind power plant-related data include solution parameters, site parameters, market parameters and financing parameters,
wherein said solution parameters include costs and performance related to the selected number of wind turbines in the wind power plant and the selected type of wind turbines according to said scenario, wherein said site parameters include wind conditions affecting the selected number of wind turbines in the wind power plant and the selected type of wind turbines according to said scenario, said market parameters include rules and regulations affecting the selected number of wind turbines in the wind power plant and the selected type of wind turbines according to said scenario, wherein said financing parameters include cost of capital related to the selected number of wind turbines in the wind power plant and the selected type of wind turbines according to said scenario, wherein said wind power plant-related data include estimated revenues related to the scenario, calculating the profitability of the wind power plant by means of a data processing system, by making use of said solution parameters, site parameters, market parameters and financing parameters, in relation to at least one scenario, presenting at least one profitability model related to establishing a wind power plant based on said at least one scenario and the calculated profitability by means of said data processing system.

Furthermore, the invention relates to a method of establishing a profitability model related to the establishment of a wind power plant, the method comprising the steps of:

establishing wind power plant-related data related to a scenario, wherein the scenario is at least partly defined by a selected number of wind turbines in the wind power plant and a selected type of wind turbines and wherein said wind power plant-related data include solution parameters and financing parameters, wherein said solution parameters include costs and performance related to the selected number of wind turbines in the wind power plant and the selected type of wind turbines according to said scenario, wherein said financing parameters include cost of capital related to the selected number of wind turbines in the wind power plant and the selected type of wind turbines according to said scenario, wherein said wind power plant-related data include estimated revenues related to the scenario, calculating the profitability of the wind power plant by means of a data processing system, by making use of said solution parameters and financing parameters, in relation to at least one scenario, presenting at least one profitability model related to establishing a wind power plant based on said at least one scenario and the calculated profitability by means of said data processing system.

Furthermore, the invention relates to a method of establishing a profitability model related to the establishment of a wind power plant, the method comprising the steps of:

establishing wind power plant-related data related to a scenario, wherein the scenario is at least partly defined by a selected number of wind turbines in the wind power plant and a selected type of wind turbines and wherein said wind power plant-related data include solution parameters, financing parameters and site parameters, wherein said solution parameters include costs related to the selected number of wind turbines in the wind power plant and the selected type of wind turbines according to said scenario, wherein said financing parameters include costs related to the selected number of wind turbines in the wind power plant and the selected type of wind turbines according to said scenario, wherein said site parameters include costs related to the selected number of wind turbines in the wind power plant and the selected type of wind turbines according to said scenario, wherein said wind power plant-related data include estimated revenues related to the scenario, calculating the profitability of the wind power plant by means of a data processing system, by making use of said solution parameters, financing parameters and site parameters, in relation to at least one scenario, presenting at least one profitability model related to establishing a wind power plant based on said at least one scenario and the calculated profitability by means of said data processing system.

Furthermore, the invention relates to a method of establishing a profitability model related to the establishment of a wind power plant, the method comprising the steps of:

establishing wind power plant-related data related to a scenario, wherein the scenario is at least partly defined by a selected number of wind turbines in the wind power plant and a selected type of wind turbines and wherein said wind power plant-related data include solution parameters, financing parameters and market parameters, wherein said solution parameters include costs and performance related to the selected number of wind turbines in the wind power plant and the selected type of wind turbines according to said scenario, wherein said financing parameters include cost of capital related to the selected number of wind turbines in the wind power plant and the selected type of wind turbines according to said scenario, wherein said market parameters include rules and regulations affecting the selected number of wind turbines in the wind power plant and the selected type of wind turbines according to said scenario, wherein said wind power plant-related data include estimated revenues related to the scenario, calculating the profitability of the wind power plant by means of a data processing system, by making use of said solution parameters, financing parameters and market parameters, in relation to at least one scenario, presenting at least one profitability model related to establishing a wind power plant based on said at least one scenario and the calculated profitability by means of said data processing system.

Furthermore, the invention relates to a method of establishing a profitability model related to the establishment of a wind power plant, the method comprising the steps of:

establishing wind power plant-related data related to a scenario, wherein the scenario is at least partly defined by a selected number of wind turbines in the wind power plant and a selected type of wind turbines and wherein said wind power plant-related data include solution parameters and site parameters, wherein said solution parameters include costs and performance related to the selected number of wind turbines in the wind power plant and the selected type of wind turbines according to said scenario, wherein said site parameters include wind conditions affecting the selected number of wind turbines in the wind power plant and the selected type of wind turbines according to said scenario, wherein said wind power plant-related data include estimated revenues related to the scenario, based on costs and revenues related to said wind power plant-related data calculating the profitability of the wind power plant by means of a data processing system, by making use of said solution parameters and site parameters, in relation to at least one scenario, presenting at least one profitability model related to establishing a wind power plant based on said at least one scenario and the calculated profitability by means of said data processing system.

In an embodiment of the invention the profitability model may be calculated by means of the one of the following equations:

$$I = C + R_c + P \quad \text{a)}$$

$$I = C + R_c + P + R_p \quad \text{b)}$$

BRIEF DESCRIPTION OF THE DRAWINGS

The invention will be described in the following with reference to the figures in which.

DETAILED DESCRIPTION OF THE INVENTION

According to the invention, a wind turbine is converting wind into electric energy. The conversion is done when forces related to the wind makes the rotor blade of the wind turbine turn. The rotor blade is mechanically connected to a shaft which again is mechanically connected to the rotor of a generator which finally converts the wind energy to electric energy, e.g. distributed to a utility grid or a local supply grid.

According to the invention a wind power plant comprises one or multiple wind turbines located at one specific site on- or offshore. Typically, a wind power plant comprises between 1 and 100 wind turbines which are electrically connected, so that the electrical energy produced by each wind turbine in the wind power plant is distributed to the same utility grid.

Figure 1A:
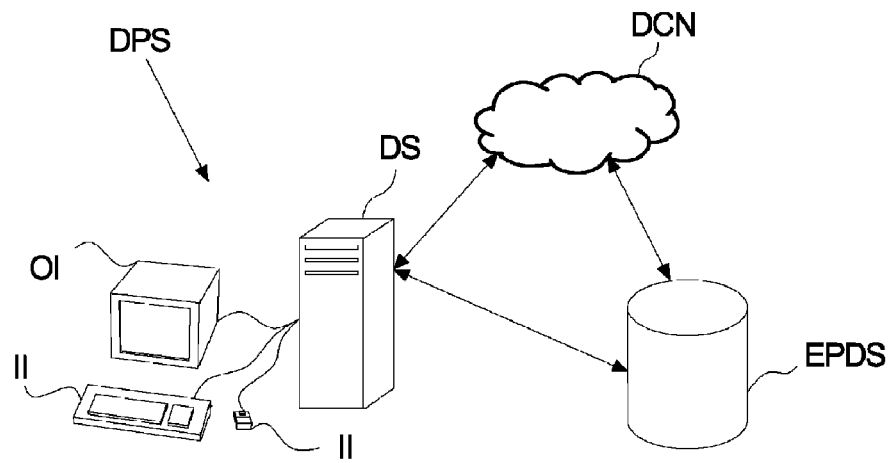
FIGS. 1A and 1B illustrate a data processing system that may be used to execute a profitability model according to an embodiment of the invention.

FIG. 1A illustrates a data processing system DPS capable of running a profitability model. The data processing system DPS may comprise input interface II which may include keyboard, pointing tool, external data processors or any other suitable input interface II required to control the execution of the profitability model. The data processing system DPS may also comprise an output interface OI which may include displaying arrangements e.g. monitor, printer, graphs, sheets, email, LAN, WAN, Wi-Fi, Bluetooth, sound arrangements or any other internal or external output interface OI applicable in connection with the profitability model for the purpose of presentation or export of data output from the model.

In an embodiment of the invention, the data processing system DPS is a computer or other digital data processing system required to execute the profitability model.

In an embodiment of the invention, the data processing system DPS comprises a data storage DS comprising data required to execute the profitability model.

In an embodiment of the invention, the data processing system DPS may be directly connected to an external data processing system EDPS which may be comprised by a server, database, storing means or any other data processing means required to execute the profitability model or for handling of the data output/input of the model.

In another embodiment of the invention, a data communication network DCN may connect the data processing system DPS and the external data processing system EDPS. The data communication network DCN may e.g. be the Internet, a wireless connection, local area network, wide area network or any other data communication network.

The external data processing system EDPS may in one embodiment of the invention be used for updating the data storage DS located in the data processing system DPS.

Figure 1B:
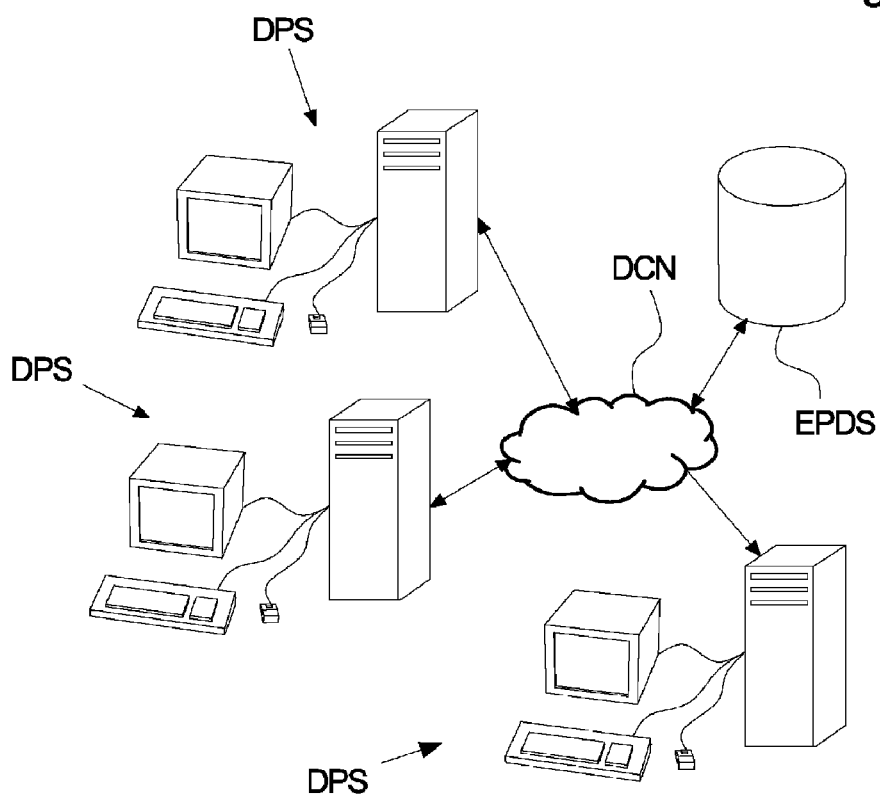

FIG. 1B illustrates an embodiment of the invention where it is possible to upload or download parameters or other relevant data related to the profitability model from different data processing systems DPS via a data communication network DCN e.g. LAN, WAN, Wi-Fi, Bluetooth or IR. Users of the profitability model with access to the data communication network DCN is then allowed submitting or updating parameters at the external data processing system EDPS which may be a data base for parameters and information related to the profitability model. The user may e.g. be a model operator, a sales representative, a customer, an investor, a bank, an engineer, etc. The parameters could e.g. be collected from a website, where the users login and submit or retrieve their data. Furthermore, the user in one embodiment of the invention may run the profitability model from the website.

Figure 2:
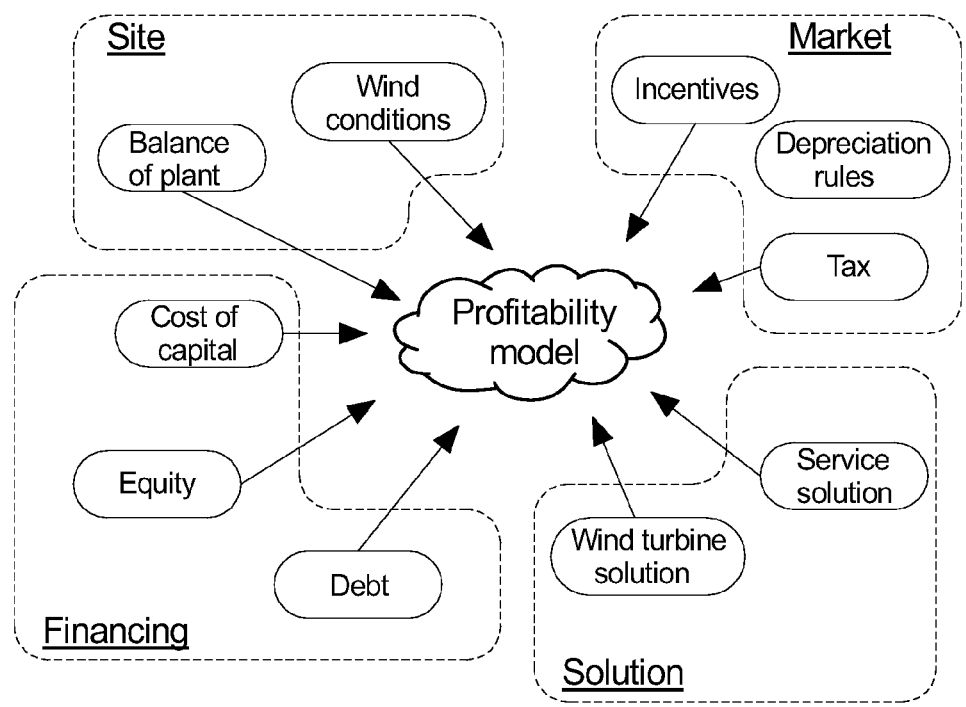
FIG. 2 illustrates different parameter types as input to the profitability model according to an embodiment of the invention.

FIG. 2 illustrates a preferred embodiment of the invention where parameters related to a wind power plant are applied to the profitability model regarding four main input parameter types; Site, Market, Financing and Solution.

The four main input parameter types may cover several hundred parameters, in a preferred embodiment of the invention, at least 400 input parameters with each parameter describing at least one detail of information related to the wind power plant.

In an embodiment of the invention it is the model operator's responsibility to gather as many of the parameters as possible. The more parameters gathered the more reliable scenario the profitability model is presenting of the wind power plant.

The model operator typically has access to a data processing system DPS comprising data from or data derived from information related to earlier wind power plant projects. Data submitted by the customer also makes the scenario of the wind power plant more reliable.

Experience from previous projects, technical insight and reliable data from the customer may in this connection be designated as verified data or verified parameters.

Data/parameters which e.g. are not accessible or are to be revealed later in the planning of the wind power plant is applied to the profitability model by means of assumptions and later in the project when verified data is available, replaced with verified data, if such data may be provided. If these data are not available, the data based on assumption may be used.

In FIG. 2 some important parameter types are illustrated. Further or fewer parameter types may be applied within the scope of the invention.

Site

The first of the input parameter type is called "site". Site may comprise parameters related to the specific site where the wind power plant is to be built. One preferred category of such parameters may e.g. relate to weather conditions. Parameters related to weather conditions may e.g. be wind speed, turbulence, wind shear, wind speed at wind peaks, height of anemometer and all other parameters describing the weather at the site of the projected wind power plant.

A second category of parameters related to the site is balance of plant. These parameters could e.g. be expenses regarding infrastructure such as access roads to the site, new roads or extension of already existing roads and expenses regarding temporary housing and transportation of workers or shipment of materials and workers if the site is e.g. offshore.

Further categories contains parameters related to the site which e.g. may be rules and regulations related to e.g. grid connection of the wind power plant Market The second input parameter type is called "market". Market may comprise parameters related to the country or region of the site of the wind power plant.

A first and second category of parameters relates to rules and regulations regarding depreciation, tax etc. which may be determined by the government, council or other institutions.

A third category of parameters relates to special incentives given by e.g. the government, council or other institutions. Incentives could be special dispensation or exempt from tax, value added tax, etc. Other incentives could be related to renewable energy certificates e.g. certificates related to carbon emission reduction.

Financing

The third main input parameter type is called "financing". Financing may comprise parameters related to the financial situation of the customer, investor or any other capital partners relevant to the wind power plant and the profitability model.

One category of parameters relates to debt. This category may include parameters as the loan type the customer is offered from e.g. a bank, investor or capital partner, duration of loan etc.

A second category of parameters relates to the cost of capital. This category may include parameters regarding the interest rate that the customer is offered from e.g. a bank, investor or capital partner.

A third category of parameters relates to the present financial gearing, equity, of the customer or investor. This category may include parameters regarding, debt/equity ratio, etc.

Further categories related to the third main input parameter type "financing" may include parameters related to the customers desired return on investment (ROI), discounting factor, customer's desired pay back time on the investment etc.

SOLUTION

The fourth parameter type is called "solution". Solution may be divided into two sub-types comprising parameters related to the wind turbine solution and parameters related to the service and maintenance solution of the wind turbine.

Parameters related to the selection of wind turbine solution may e.g. relate to type of wind turbine, manufacturer, height of the wind turbine, noise level, production of energy such as power curves for different wind turbines working under different wind conditions or all other parameters related to the selection of one or more wind turbine solutions. A wind turbine solution may include one or more wind turbines.

Parameters related to the selection of service and maintenance solution of the wind turbine may e.g. relate to different agreements, costs of service and maintenance categorized as predictable maintenance, costs of service and maintenance categorized as unpredictable maintenance or all other parameters related to service and maintenance.

In an embodiment of the invention, all input parameters have a predefined default value when starting the profitability model. The default value may during the project period be replaced or supplied with assumptions or by verified data, making the scenario presented by the profitability model more and more reliable.

In an alternative embodiment of the invention, the parameters applied to the profitability model are examined through e.g. a parameter test process. If the applied parameter is not within a predefined interval from the default parameter the profitability model may notice the user if e.g. the default parameter should be obtained. This may prevent input faults from affecting the final scenario presented by the profitability model. In an embodiment of the invention, it may be possible to adjust this interval.

In an embodiment of the invention, simulation programs are used to generate some of the parameters to the profitability model. Parameters from simulation programs are more reliable than assumptions of e.g. the estimated energy production of the wind turbines in a wind power plant.

One example of a simulation program could be a program simulating the optimal location of each wind turbine within a wind power plant to maximize the total energy production of the wind power plant. Such simulation may e.g. be based on information related to wind speed, -turbulence and -peaks.

One scenario presented by the profitability model may e.g. be a comparison of different scenarios comprising e.g. a summary of key inputs, financial outcome or comparison of graphs.

In an embodiment of the invention, the profitability model receives parameters without categorizing the parameters into parameter types.

Figure 3:
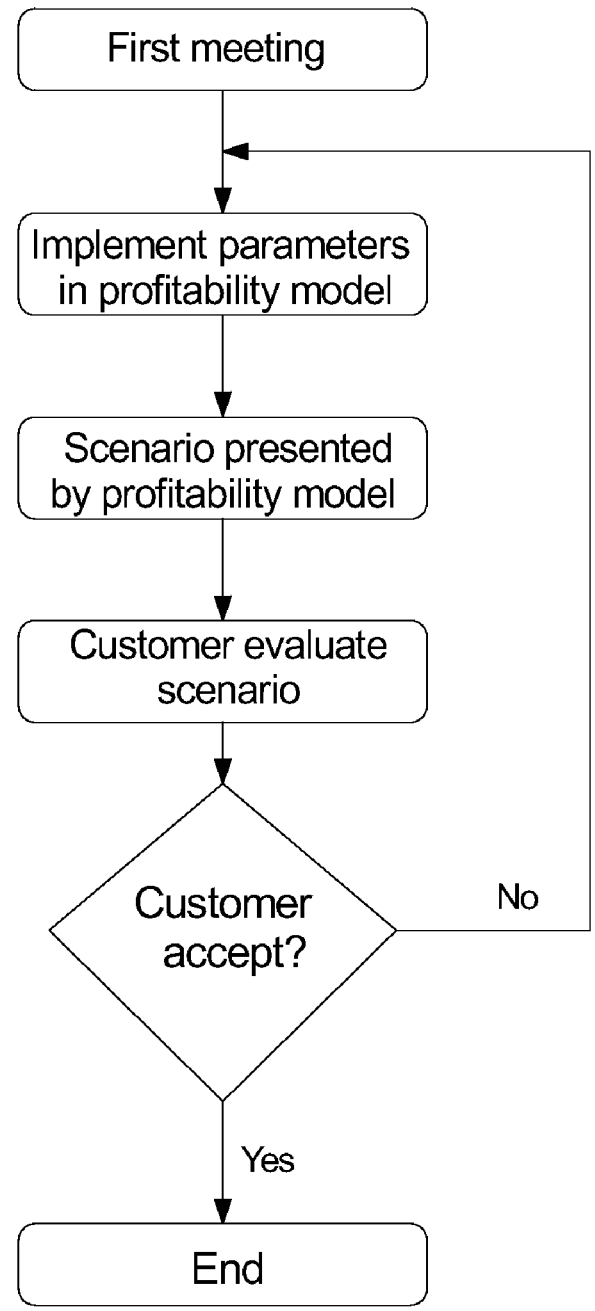
FIG. 3 illustrates a flow diagram of the iterative process of data collection and implementation of data in the profitability model according to an embodiment of the invention.

FIG. 3 illustrates a flow diagram of a simplified use of the profitability model according to an embodiment of the invention during the project phases. The flow diagram initiates with the first meeting between the customer and the model operator, e.g. sales representatives. The main purpose of this meeting is to collect as much verified parameters from the main input parameter types, e.g. "site", "market", "financing" and "solution" and use these as input to the profitability model. All parameters of which there are no verified parameters available is either filled out with assumptions or the default value is used to get a first scenario from the profitability model.

In an embodiment of the invention, the majority of the overall input parameters to the profitability model is based on assumptions and a relatively small part of the overall input parameters to the profitability model is based on verified data.

Based on the first scenario from the profitability model the customer may decide if the project is to be rejected or continued. If the customer rejects the project as described in the scenario from the profitability model, the project is either turned down or parameters are changed to fit e.g. the demands from the customer.

If the scenario is not satisfactory it may be possible to change or add parameters and thereby remodel the scenario for the wind power plant. Hence it is possible for the model operator to instantly present various scenarios to the customer generated by the profitability model.

If the customer accepts the first project presented from the profitability model a new meeting may be arranged when even more verified parameters have been retrieved and implemented in the profitability model. More than one meeting may often be required in order to reach an improved scenario from the profitability model which may be accepted both by the customer and by the model operator.

If the project is not turned down during the meetings the basis for decision is increased because the profitability model is applied with more and more verified parameters, e.g. studies of weather conditions are obtained at the site and it may thereby e.g. be possible to make a better estimation of the energy production of the wind power plant from simulations.

In an embodiment of the invention, the output from the profitability model may be used as a project verification regarding the investor such as a bank. When financing a large project such as e.g. a wind power plant, it is vital for e.g. the cost of capital that the profitability model is highly reliable. The cost of capital could be described as a function of the profitability model reliability.

In one embodiment of the invention, the profitability model is used as an internal strategic wind power plant economic tool for the model operator. By modelling different scenarios from the inputs which the model operator obtains at the meetings, the model operator is able to choose the most suitable scenario with respect to the site, market and customer.

In another embodiment of the invention, the scenarios from the profitability model may enable the model operator to issue fairness of a given project price by taking the customers benefit on basis of the project and the competitive projects into account.

In another embodiment of the invention, the scenarios presented by the profitability model may be used by the model operator to evaluate a product portfolio. If a competitive product appears as the optimal product for a project it may indicate that a similar product is needed in the product portfolio being evaluated.

If it is decided to carry out the project, the profitability model may be regularly updated with information related to the applied input parameter types such as site, financing, solution and market during the complete project period, as e.g. wind turbine type is decided and the amount of verified data increases compared to the amount of data based on assumptions.

Other parameters which may be updated during the project period may e.g. be parameters related to the market such as changed rules and regulations, parameters related to the site such as more reliable information related to the weather at the site, parameters related to the financing such as cost of capital or parameters related to the scenario such as number of wind turbines at the site.

In one embodiment of the invention, the profitability model may be used after the wind power plant is built and put into operation. Additional site information such as more reliable or updated information about wind conditions at the site may be applied to the profitability model to perform an even better forecast of the financial risk, including estimated energy production. This may be relevant if e.g. the investor needs additional loans or would like to expand the wind power plant. Also additional financing information may be applied to the profitability model after the wind power plant is put into operation. If e.g. a part of the financing of the wind power plant is based on loans with variable interest rate the effect of a changed interest rate can change the scenario processed by the profitability model.

In one embodiment of the invention, the profitability model may be used to find the most cost-efficient price for a wind power plant, for both the customer and the vendor and thereby help to decide whether or not an investment is cost-efficient.

In an embodiment equation a and b are two very simplified examples of the calculation needed to obtain a profitability model for at least a period of time e.g. between 0 and 25 years.

$$I=C+R_c+P \quad \text{a)}$$

$$I=C+R_c+P+R_p \quad \text{b)}$$

In equation a, if I=0 the estimated cost of the investment equals the estimated profit to the customer and vendor plus the estimated costs related to build up the wind power plant plus a risk factor related to the costs.

In equation b, if I=0 the estimated cost of the investment equals the estimated profit to the customer and vendor plus the estimated costs related to build up the wind power plant plus a risk factor to related to both the costs and profit.

In the equations the following represents estimations of:
I=Investment. The investment covers the total cost a customer has to pay for a wind power plant and in this example also the customers profit.
C=Cost. The cost covers costs related to at least some of the above-mentioned solution-, site-, marked- or financing parameters.
$R_c$=Risk related to cost. This risk is an estimation of the risk the customer is willing to take in relation to cost of at least some of the above-mentioned solution-, site-, marked- or financing parameters. Examples of such costs could e.g. be expenses related to maintenance or ejection of the wind power plant, production of electricity, etc.
$R_p$=Risk related to profit. This risk is an estimation of the risk the customer and vendor is willing to take in relation to the profit of an investment. There may be several parameters influencing on this and some of them may be the same parameters as influencing on the risk related to costs.
P=Profit. The profit is the part of the investment left to the vendor and customer when the wind turbine is up and running.

It should be noted that the above-mentioned equations are very simplified and only used to illustrate the fundamental principles of one way of making a profitability model.

Figure 4:
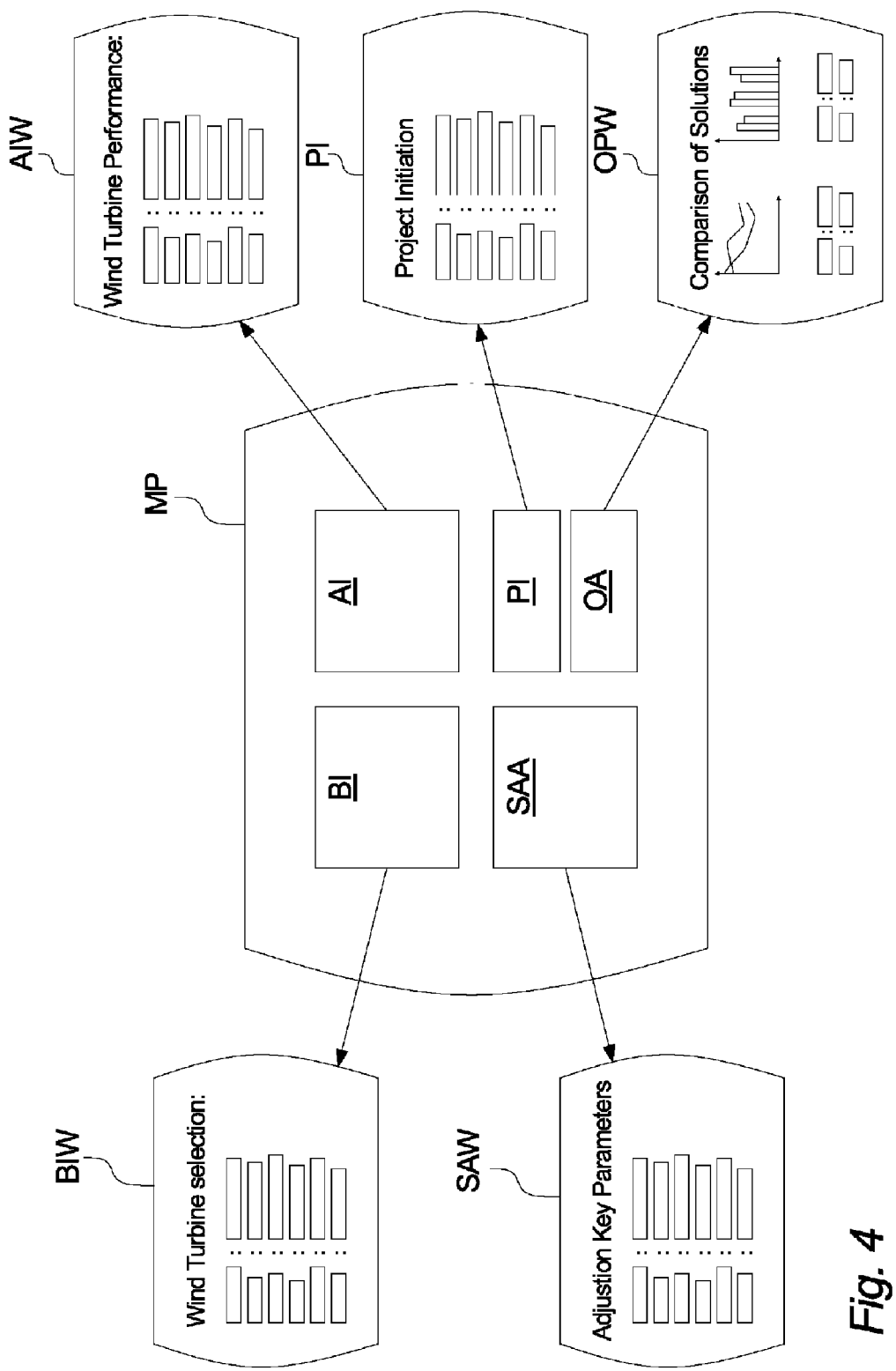
FIG. 4 illustrates different user interfaces when using the profitability model according to one embodiment of the invention.

FIG. 4 illustrates a non-limiting example of elements of the profitability model's graphical user interface in an embodiment of the invention. The main page MP of the graphical user interface comprises at least one data area designed to receive parameters related to the wind power plant project.

In an embodiment of the invention, the main page MP comprises five data areas: project initiation PI, basic input BI, advanced input AI, sensitivity analysis area SAA and output OA.

By activating a data area at the main page MP a pop-up window appears designed to receive parameters related to the activated area.

In an alternative embodiment of the invention, parameters are e.g. received directly at the main page MP from e.g. a drop down menu or loaded from an internal- or external application, data port or by other similar means.

The project initiation PI is used to register the preliminary details of a wind power plant project. By activating the project initiation PI area the user is allowed to input project initiation information in a project initiation window PIW. Project initiation information may e.g. comprise project name, customer name, project ID, project country or other information related to the wind power plant project.

The basic input BI is used to make a quick assessment of the profitability of the wind power plant project from an investor's point of view. Basic input BI comprises primary parameters about financial terms regarding the wind power plant project. By activating the basic input BI area the user is allowed to type in or implement parameters regarding basic input BI in a basic input window BIW which e.g. may comprise parameters regarding wind turbine selection, site details and production, project financing, project revenue, costs and lead time or other parameters related to the wind power plant project.

Wind turbine selection may e.g. comprise selection of wind turbine manufacture, wind turbine model, number of wind turbines, hub height or any other parameters related to the wind turbines of the wind power plant project.

Site details and production may e.g. comprise parameters as anemometer height (height of wind measurements), wind conditions, availability factor, net annual MWh production (estimated annual MWh production of the wind power plant) or any other parameters related to the site details and production of the wind power plant project.

Product financing may e.g. comprise parameters as loan type, duration of loan, debt interest rate, the financial discount factor related to the investors cost of capital, debt service coverage ratio or any other parameters related to the financing of the wind power plant project.

Project revenue may e.g. comprise parameters as power purchasing agreement (price per MWh), merchant price (secondary price per MWh), yearly price adjustment, detailed prices (different prices over the lifetime of the project) or any other parameters related to the project revenue of the wind power plant project.

Cost and lead time may e.g. comprise parameters as cost of wind turbine supplies, project management costs, development costs, operating costs per MWh, production lead time or any other parameters related to the cost and lead time of the wind power plant project.

The advanced input AI is used to simulate a wind power plant project and thereby obtain a greater degree of accuracy than possible with the basic input BI. By activating the advanced input AI area the user is allowed to input advanced inputs AI in an advanced input window AIW which e.g. may comprise parameters related to wind turbine performance and production, costs, project timing, equity, debt and working capital assumptions, tax and accounting, service and maintenance or other parameters related to the wind power plant project.

Wind power plant performance and production may e.g. comprise parameters as wind turbine type for the wind power plant including height, capacity (MW) and number of wind turbines in the wind power plant. Furthermore, parameters related to spatial wind distribution and to losses and efficiency of the individual wind turbine or the wind power plant as a whole may be applied to the profitability model or any other parameters related to performance and production of the wind power plant project.

Project costs and any costs related to the wind power plant project may be split up in a way so that all costs related to the wind power plant are apportioned as an estimated cost per wind turbine in the wind power plant. These costs reflect the development of a project and may e.g. comprise consultant fees, insurance during construction, security costs or any other parameters related to costs of the wind power plant project.

Project timing may be used for illustrative purpose and may e.g. illustrate timing of payment or any other parameters related to project timing of the wind power plant project.

Equity, debt and working capital assumptions related to the customer's financial situation may e.g. comprise equity assumptions regarding net present value of the project, finance transaction costs such as the customer's costs to financial transaction, other consultant fees and financial insurance, construction equity backed debt covering costs of short term loans (obtained to cover expenses during the construction phase), construction senior debt may e.g. comprise interest rate, duration of long-term loan and the type of loan, or other parameters related to equity, debt and working capital of the wind power plant project.

Tax and accounting may e.g. comprise parameters such as different taxes, depreciation or any other parameters related to tax and accounting of the wind power plant project.

Service and maintenance may e.g. comprise different revenues and costs that will occur during the lifetime of a wind power plant such as e.g. service costs per. MWh, annual operating costs or any other parameters related to service and maintenance of the wind power plant project.

The sensitivity analysis area SAA may e.g. be used by the model operator to model various scenarios by adjusting key input parameters in the profitability model. By activating the sensitivity analysis area SAA the user is allowed to adjust key parameters, in a sensitivity analysis window SAW. It may e.g. be possible to adjust key input parameters regarding revenue, costs and finance.

Key input parameters regarding revenue may be estimated annual MWh production, availability (effective time the wind turbine is producing energy) and revenue per MWh.

Key input parameters regarding costs may be wind turbine, towers, transportation, erection, civil works or other costs related to the wind power plant project.

Key input parameters regarding finance may be the financial discount factor related to the investors cost of capital, duration of loan and other parameters regarding the financing of a wind power plant project.

The output area OA may e.g. be used to display various outputs of a scenario produced by the profitability model or to compare different scenarios. By activating the output area OA in an embodiment of the invention the user is allowed to choose between three different output types relating to the current scenario, a comparison of two or more scenarios and other outputs.

By choosing output regarding the current scenario the profitability model may present the consolidated financial statement including income statement, balance sheet, cash flow, etc. Furthermore, it may be possible for the profitability model to generate various graphs regarding the current scenario to illustrate various key drivers in the wind power plant project. These graphs would preferably include cash flow, capital expenditures, operating expenditures, etc. and display the trend over a user-defined period e.g. fifteen or twenty years.

By choosing output regarding comparison of two or more scenarios the profitability model may present a detailed comparison sheet presenting several key inputs and financial outcomes of the entire content of the chosen scenarios for comparison. Furthermore, it may be possible for the profitability model to generate various comparison graphs to illustrate diversity between various key drivers among the chosen scenarios. These graphs would preferably include wind turbine production curves, wind turbine costs, project costs, project NPV (project net present value), etc.

By choosing other output the profitability model may present user-defined calculation sheets, graphs or other information regarding the wind power plant project e.g. contact information regarding customers, investors, suppliers, etc.

What is claimed is:

1. A method of establishing a profitability model related to the establishment of a wind power plant, the method comprising:
   receiving data defining a scenario of the wind power plant, wherein said scenario is at least partly defined by the received data to include two or more selected wind turbines in the wind power plant and a selected type of the selected wind turbines and
   wherein said received data include solution parameters and financing parameters,
      wherein said solution parameters include costs and performance related to the selected wind turbines in the wind power plant and the selected type of the selected wind turbines, wherein the performance is at least based on a location of each of the selected wind turbines, relative to each other, in the wind power plant,
      wherein said financing parameters include cost of borrowing capital related to the selected wind turbines in the wind power plant and the selected type of the selected wind turbines,
   calculating, by means of a data processing system, a profitability of the wind power plant based on said solution parameters and financing parameters,
   presenting at least one profitability model related to establishing the wind power plant based on said scenario and the calculated profitability by means of said data processing system.

2. A method of establishing a profitability model related to establishment of a wind power plant according to claim 1, wherein said received data comprise market parameters, and wherein said market parameters include rules and regulations affecting the selected wind turbines in the wind power plant and the selected type of the selected wind turbines.

3. A method of establishing a profitability model related to establishment of a wind power plant according to claim 1, wherein said received data comprise site parameters, and wherein said site parameters include wind conditions affecting the selected wind turbines in the wind power plant and the selected type of the selected wind turbines.

4. A method of establishing a profitability model related to establishment of a wind power plant according to claim 1, wherein said scenario represents a projected wind power plant.

5. A method of establishing a profitability model related to establishment of a wind power plant according to claim 1, wherein there is a plurality of selected wind turbines, and wherein said selected type of the selected wind turbines are the same type of wind turbines.

6. A method of establishing a profitability model related to establishment of a wind power plant according to claim 1, wherein there is a plurality of selected wind turbines, and wherein said selected type of the selected wind turbines are different types of wind turbines.

7. A method of establishing a profitability model related to establishment of a wind power plant according to claim 1, wherein said selected type of the selected wind turbines in different scenarios includes wind turbine types from one or more wind turbine manufacturers.

8. A method of establishing a profitability model related to establishment of a wind power plant according to claim 1, wherein said received data relates to parameters at least partly related to assumptions related to establishing the wind power plant.

9. A method of establishing a profitability model related to establishment of a wind power plant according to claim 1, wherein the profitability model includes two or more scenarios.

10. A method of establishing a profitability model related to establishment of a wind power plant according to claim 1, further comprising automatically establishing and presenting at least one alternative scenario related to establishing the wind power plant, wherein the alternative scenario has different parameters from the said scenario.

11. A method of establishing a profitability model related to establishment of a wind power plant according to claim 1, wherein said profitability model is used to forecast the financial risk for the wind power plant.

12. A method of establishing a profitability model related to establishment of a wind power plant according to claim 1, wherein said profitability model is used to estimate the financial situation of the wind power plant as a result of the scenario being modified over time after the wind power plant is put into operation.

13. A method of establishing a profitability model related to establishment of a wind power plant according to claim 1, wherein said solution parameters further comprise parameters relating to at least one of: the make of the wind turbines, hub height of wind turbines and service and maintenance of the wind turbines.

14. A method of establishing a profitability model related to establishment of a wind power plant according to claim 1, wherein said financing parameters further comprise parameters relating to at least one of: type of loan, duration of loan, debt financing and debt interest rate.

15. A method of establishing a profitability model related to establishment of a wind power plant according to claim 2, wherein said market parameters comprise parameters relating to at least one of: taxes, depreciation and special incentives for the wind power plant related to a market.

16. A method of establishing a profitability model related to establishment of a wind power plant according to claim 3, wherein said site parameters comprise parameters relating to at least one of: wind conditions, average wind speed, turbulence, wind shear, anemometer height, an availability factor, net annual production and data received from at least one simulation program.

17. A method of establishing a profitability model related to the establishment of a wind power plant, the method comprising:
   receiving data defining a scenario of the wind power plant, wherein said scenario is at least partly defined by the received data to include a plurality of selected wind turbines in the wind power plant and a selected type of each of the selected wind turbines and
   wherein said received data include solution parameters and market parameters,
      wherein said solution parameters include costs and performance related to the selected plurality of wind turbines in the wind power plant and the selected type of the plurality wind turbines, wherein the performance is at least based on a location of each of the selected wind turbines, relative to each other, in the wind power plant,
      wherein said market parameters include rules and regulations affecting the selected wind turbines in the wind power plant and the selected type of the selected wind turbines,
   calculating, by means of a data processing system, a profitability of the wind power plant based on said solution parameters and market parameters, presenting at least one profitability model related to establishing the wind power plant based on said scenario and the calculated profitability by means of said data processing system.

18. A method of establishing a profitability model related to the establishment of a wind power plant, the method comprising:
receiving data defining a scenario of the wind power plant,
wherein said scenario is at least partly defined by the received data to include a plurality of selected wind turbines in the wind power plant and a selected type of each of the selected wind turbines and
wherein said received data include solution parameters, site parameters and market parameters
wherein said solution parameters include costs and performance related to the selected wind turbines in the wind power plant and the selected type of the selected wind turbines, wherein the performance is at least based on a location of each of the selected wind turbines, relative to each other, in the wind power plant,
wherein said site parameters include wind conditions affecting the selected wind turbines in the wind power plant and the selected type of the selected wind turbines according to said scenario,
said market parameters include rules and regulations affecting the selected wind turbines in the wind power plant and the selected type of the selected wind turbines,
calculating, by means of a data processing system, a profitability of the wind power plant based on said solution parameters, site parameters and market parameters,
presenting at least one profitability model related to establishing the wind power plant based on said scenario and the calculated profitability by means of said data processing system.

19. A method of establishing a profitability model related to the establishment of a wind power plant, the method comprising:
receiving data defining a scenario of the wind power plant,
wherein said scenario is at least partly defined by the received data to include two or more selected wind turbines in the wind power plant and a selected type of the selected wind turbines and
wherein said received data include solution parameters, site parameters, market parameters and financing parameters,
wherein said solution parameters include costs and performance related to the selected wind turbines in the wind power plant and the selected type of the selected wind turbines, wherein the performance is at least based on a location of each of the selected wind turbines, relative to each other, in the wind power plant,
wherein said site parameters include wind conditions affecting the selected wind turbines in the wind power plant and the selected type of the selected wind turbines,
wherein said market parameters include rules and regulations affecting the selected wind turbines in the wind power plant and the selected type of the selected wind turbines,
said financing parameters include cost of borrowing capital related to the selected wind turbines in the wind power plant and the selected type of the selected wind turbines,
calculating, by means of a data processing system, a profitability of the wind power plant based on said solution parameters, site parameters, market parameters and financing parameters,
presenting at least one profitability model related to establishing the wind power plant based on said scenario and the calculated profitability by means of said data processing system.

20. A method of establishing a profitability model related to the establishment of a wind power plant, the method comprising:
receiving data defining a scenario of the wind power plant,
wherein said scenario is at least partly defined by the received data to include a plurality of selected wind turbines in the wind power plant and a selected type of each of the selected wind turbines and
wherein said received data include solution parameters and site parameters,
wherein said solution parameters include costs and performance related to the selected wind turbines in the wind power plant and the selected type of the selected wind turbines, wherein the performance is at least based on a location of each of the selected wind turbines, relative to each other, in the wind power plant,
wherein said site parameters include wind conditions affecting the selected wind turbines in the wind power plant and the selected type of the selected wind turbines,
calculating, by means of a data processing system, a profitability of the wind power plant based on said solution parameters and site parameters,
presenting at least one profitability model related to establishing the wind power plant based on said scenario and the calculated profitability by means of said data processing system.

21. A method of establishing a profitability model related to the establishment of a wind power plant according to any of the proceeding claims, wherein the profitability model is calculated by means of the one of the following equations:

$$I = C + R_c + P \qquad \mathrm{a)}$$

$$I = C + R_c + P + R_p \qquad \mathrm{b)}$$

* * * * *

UNITED STATES PATENT AND TRADEMARK OFFICE Certificate

Patent No. 8,335,731 B1  Patented: December 18, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kristoffer Claudi Heller, Barcelona (ES); Flemming Lundager Petersen, Arhus V (DK); Allan Linderup Smed, Skodstrup (DK); Martin Duraj Jensen, Aalborg (DK); and Henry Graham Farrell, Aarhus (DK).

Signed and Sealed this Fourth Day of June 2013.

CHARLES KYLE
*Supervisory Patent Examiner*
Art Unit 3695
Technology Center 3600